(12) United States Patent
Mortazavi et al.

(10) Patent No.: US 12,115,501 B2
(45) Date of Patent: Oct. 15, 2024

(54) METHOD FOR FOULING REDUCTION ON THE SURFACE OF CERAMIC MEMBRANES USING STEAM FAST-FLUSHING

(71) Applicant: His Majesty the King in Right of Canada as Represented by the Minister of Natural Resources, Ottawa (CA)

(72) Inventors: Saviz Mortazavi, Ottawa (CA); André Yves Tremblay, Ottawa (CA)

(73) Assignee: HIS MAJESTY THE KING IN RIGHT OF CANADA AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 0 days.

(21) Appl. No.: 17/271,893

(22) PCT Filed: Feb. 13, 2020

(86) PCT No.: PCT/CA2020/050187
§ 371 (c)(1),
(2) Date: Feb. 26, 2021

(87) PCT Pub. No.: WO2020/163955
PCT Pub. Date: Aug. 20, 2020

(65) Prior Publication Data
US 2021/0260533 A1   Aug. 26, 2021

Related U.S. Application Data

(60) Provisional application No. 62/805,465, filed on Feb. 14, 2019.

(51) Int. Cl.
*B01D 65/02* (2006.01)
*B01D 69/02* (2006.01)
(Continued)

(52) U.S. Cl.
CPC .............. *B01D 65/02* (2013.01); *B01D 69/02* (2013.01); *B01D 71/022* (2013.01);
(Continued)

(58) Field of Classification Search
CPC ............ B01D 2321/00; B01D 2321/04; B01D 2321/08; B01D 2321/12; B01D 65/02;
(Continued)

(56) References Cited

U.S. PATENT DOCUMENTS

| 4,840,769 A | 6/1989 | Nejigaki et al. |
| 5,132,015 A | 7/1992 | Down |

(Continued)

FOREIGN PATENT DOCUMENTS

| EP | 1498169 A1 * | 1/2005 | ............. B01D 29/21 |
| KR | 20170011431 A * | 2/2017 | ............. B01D 65/02 |

OTHER PUBLICATIONS

Seyed Mohsen Samaei, Shirley Gato-Trinidad, Ali Altaee, The application of pressure-driven ceramic membrane technology for the treatment of industrial wastewaters—A review, ScienceDirect, (Year: 2018).*

(Continued)

*Primary Examiner* — Chester T Barry
(74) *Attorney, Agent, or Firm* — Hoffman Warnick LLC

(57) ABSTRACT

The inventions discloses a method for reducing fouling on the surface of a ceramic membrane or filter with a recalcitrant filtration cake thereon that is non-responsive to regular back-flushing or other physical means of removal, where the ceramic membrane or filter is subjected to steam fast-flushing by injecting steam directly in feed channel of the ceramic membrane or filter while back-flushing the ceramic membrane or filter at the same time to heat and remove fouled layer on the ceramic membrane or filter while cooling a selective layer of the ceramic membrane or filter to avoid (Continued)

thermal shocking of the ceramic membrane or filter, the surface is cleaned with the ceramic membrane or filter being stationary.

20 Claims, 2 Drawing Sheets

(51) Int. Cl.
*B01D 71/02* (2006.01)
*C02F 1/44* (2023.01)
*C02F 101/32* (2006.01)
*C02F 103/10* (2006.01)

(52) U.S. Cl.
CPC .............. *B01D 71/025* (2013.01); *C02F 1/44* (2013.01); *B01D 2321/02* (2013.01); *B01D 2321/04* (2013.01); *B01D 2321/08* (2013.01); *B01D 2321/12* (2013.01); *B01D 2325/0283* (2022.08); *C02F 2101/32* (2013.01); *C02F 2103/10* (2013.01)

(58) Field of Classification Search
CPC ...... B01D 65/025; B01D 63/06; B01D 63/07; B01D 63/08; B01D 2201/12
See application file for complete search history.

(56) References Cited

U.S. PATENT DOCUMENTS 5,149,447 A 9/1992 Mashayekhi et al.
2015/0050694 A1 2/2015 Takeuchi et al.

OTHER PUBLICATIONS

Su Zhao, Jizhong Zhang, Duan Weng, Xiaodong Wu, A method to form well-adhered g-Al2O3 layers on FeCrAl metallic supports, Elsevier (Year: 2002).*

PCT International Search Report and Written Opinion for International Application No. PCT/CA2020/050187, dated Apr. 20, 2020, 8 pages.

* cited by examiner

METHOD FOR FOULING REDUCTION ON THE SURFACE OF CERAMIC MEMBRANES USING STEAM FAST-FLUSHING

FIELD OF THE INVENTION

The present invention relates to modified ceramic membranes for the treatment of oil sands produced water, discharge water, bitumen containing wastewater or process waters, oily wastewaters and effluent streams. The present invention relates to the development of membrane cleaning processes.

BACKGROUND OF THE INVENTION

One of the prominent issues in oil and gas exploration and production is the production of large volumes of waste in the form of produced water. These waters are produced in large quantity and need to be treated before recycling or disposal.

For example, a leading technology used for bitumen extraction from oil sands is a process known as Steam Assisted Gravity Drainage (SAGD), which consists of drilling a pair of horizontal wells four to six meters apart where steam is injected into the top well (the injection well) to heat the surrounding heavy oil, reducing its viscosity and allowing it to flow by gravity into the bottom well (producing well). This SAGD process results in an emulsion of oil and condensed water that is pumped to the surface for separation and treatment.

Effective treatment and recycling the processed water resulted from the SAGD process will assist to maintain the sustainability of the oil sands industry, and ensure the preservation of natural freshwater resources.

Synthetic membranes are commonly used in water and wastewater treatment. Most of the membranes used in these applications are polymeric in nature. However, when wastewaters originate from oil spills or in oil production, they contain oils and suspended bitumen. Most polymeric membranes fail to resist the organic components in these wastewaters. This limitation is compounded when oily waste waters are to be treated at temperatures above 80° C. To counter this, membranes with high temperature and solvent resistance are increasingly being studied for the treatment of oily wastewaters.

Use of membranes for produced water treatment has been hindered by the fouling observed in treating these feed streams, where fouling results from the adhesion of non-permeating species onto the membrane surface or from the deposition of these particles into the pores of the membrane, obstructing the flow of the permeating species which leads to an increase in trans-membrane concentration and pressure gradients.

Ceramic membranes are made from metal oxides. They maintain good structural integrity in the presence of heat and solvents. They have been used in many industries such as food, biotechnology, and pharmaceutical industries.

In the treatment of oil-water streams, oily produced water and oil sands produced water, ceramic membrane can be used.

The membrane fouling of ceramic membranes during treatment of SAGD produced water is a key factor that has prevented the widespread application of ceramic membranes in SAGD and oil sands produces water treatment and recycling.

Mitigation of fouling and flux decline is critical to economically viable applications of ceramic membranes to the treatment of produced water streams in oil sands operations.

In order to address the operational problem with ceramic membrane to maintain an economic flux range, the surface of the membranes has to be engineered and modified in order to passivate the surface and create an uncharged hydrophilic surface; however, over the long term operation of the surface modified ceramic membrane, some degree of fouling would be expected which would require periodic cleaning.

Therefore, there remains the need for efficient and effective treatment of the membrane surface for fouling reduction on the surface of ceramic membranes during treatment of SAGD produced water in order to reduce flux decline and reduce the frequency of the periodic Clean-In-Place (CIP).

SUMMARY OF THE INVENTION

According to the present application, membrane fouling is reduced and controlled by the application of steam flushing and back flushing to clean the membrane during the process.

According to the present invention, there is provided a method comprising a ceramic membrane or filter with a recalcitrant filtration cake on its surface that does not respond to regular back-flushing or other physical means of removal.

According to the present invention, the method involves periodically cleaning the membrane or filter in place without physically removing it from the process.

According to the present invention, the method involves periodically subjecting the membrane or filter to "steam fast-flushing" by injecting steam directly in the feed channel of the filter while back-flushing the filter at the same time, in order to heat and remove the fouled layer on the membrane or filter while cooling the selective layer of the membrane or filter to avoid the thermal shocking of the membrane.

According to one aspect of the invention, there is provided a method for reducing fouling on the surface of a ceramic membrane or filter, the ceramic membrane or filter has a recalcitrant filtration cake on its surface that is non-responsive to removal by regular back-flushing or other physical means of removal,
  wherein the ceramic membrane or filter is subjected to steam fast-flushing by injecting steam directly in feed channel of the ceramic membrane or filter while back-flushing the ceramic membrane or filter at the same time to heat and remove the fouled layer on the ceramic membrane or filter while cooling a selective layer of the ceramic membrane or filter to avoid thermal shocking of the ceramic membrane or filter,
  wherein the surface of ceramic membrane or filter is cleaned with the ceramic membrane or filter being stationary.

According to a preferred embodiment of the invention, the selective layer of the membrane is back-flushed and cooled by the difference in pressure of the permeate and the depressurized feed stream.

According to a preferred embodiment of the invention, steam is injected in the feed channel from the top of the module and the feed channel at the bottom of the module is connected to the feed tank.

According to a preferred embodiment of the invention, the membrane or filter is in the form of a flat sheet, multi-pleated sheet, a single tubular lumen or multi-lumen tube.

According to a preferred embodiment of the invention, the membrane material and its support is a ceramic such as an oxide of aluminum, titanium or zirconium.

According to a preferred embodiment of the invention, the material in the selective layer of the membrane is different or identical to the membrane support material.

According to a preferred embodiment of the invention, the membrane material a ceramic such as an oxide of aluminum, titanium or zirconium and its support is a metal.

According to a preferred embodiment of the invention, the filter is metallic, the pore size is 0.1 to 1000 microns.

According to a preferred embodiment of the invention, the pore size of the ceramic membrane is 1 nm to 10 microns.

According to a preferred embodiment of the invention, the membrane is inorganic.

According to a preferred embodiment of the invention, the membrane is a sintered inorganic.

According to a preferred embodiment of the invention, the cake was formed in treating any wastewater.

According to a preferred embodiment of the invention, the cake was formed in treating oily wastewater.

According to a preferred embodiment of the invention, the cake was formed in treating bituminous and oily wastewater.

According to a preferred embodiment of the invention, the cake was formed in treating steam assisted gravity drainage (SAGD) produced water or process water.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

Figure 1:
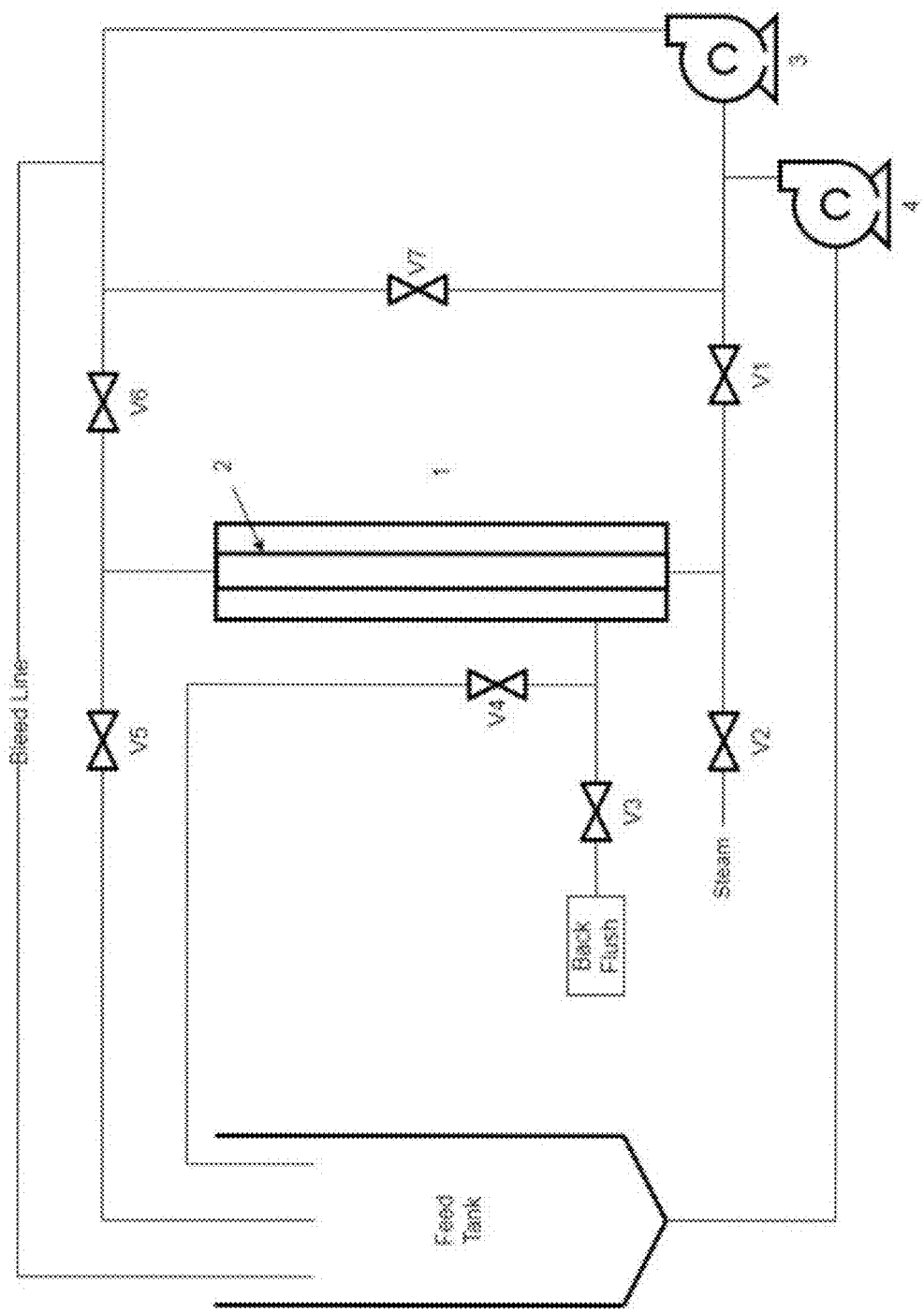
FIG. 1 is a flow diagram according to an embodiment of the present invention showing a membrane loop equipped with valves for steam fast-flushing and permeate back-flushing.

It is to be understood that the disclosure is not limited in its application to the details of the embodiments as set forth in the following description. The invention is capable of other embodiments and of being practiced or of being carried out in various ways.

Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

Oil production operations produce a large amount of oily wastewaters that contain ultrafine clay particles, solvents, resins, bitumen and other complex organics. These mixtures of fine particulates combined with oils and bitumen is particularly difficult to treat. When such a mixture is treated by traditional membrane filtration, fouling deposits form on the surface of the membrane. These deposits must be removed by chemical or physical means. The deposits can be removed with solvents or detergents; however this method produces cleaning and rinse wastewaters that must be disposed of.

Alternatively, the deposits can be removed by physical means; where permeate (fluid that has initially passed through the membrane) is pressurized and forced back through the pores of the membrane. This flow reversal is effective in removing deposits or filter cakes on the surface of the membrane when the cakes do not adhere to its surface or do not form structured networks that reinforce the cake.

Filter cakes containing materials that can coalesce and bridge can form cakes having very low permeabilities. An example of such cakes is observed when wastewaters containing fine particles, oil and bitumen are treated such as in the recycling of SAGD process waters. These cakes are also found in oil and gas operations, flotation mining, food chemical, and biotech industries to name a few. In many cases, the presence of a high concentration of suspended solids and the possibility of ionic binding or the slight polymerization of species in the cake makes them quite recalcitrant.

These recalcitrant filter cakes are difficult to back-flush and gradually increase in thickness which greatly reduces permeate flow through the membrane. The resistance of these cakes to flow is extremely high and the flux of the membrane eventually decreases to a level where the operation of the system comprising the membrane is no longer economical.

In addition to this problem, it is advantageous to treat process waters at a high temperature when they originate from operations where steam is used in the extraction process. This has the advantage of treating the wastewater when its viscosity is reduced at the higher temperatures of 80 to 100° C. and to eliminate the cooling requirements needed prior to treatment when conventional membrane materials are used in the treatment process. Avoiding the need to cool and then reheat the wastewater reduces the $CO_2$ emissions of the oil production process.

The present invention discloses the use of two simultaneous physical approaches in order to reduce the accumulation of oily particulates and bitumen on the surface of the ceramic membrane and remove recalcitrant cakes from its surface.

According to the present invention, the recalcitrant filter cake is directly heated using steam, while back-flushing the membrane with permeate.

This is done by decoupling the membrane module from the loop and injecting steam directly on the feed side of the membrane.

The outlet of the feed channel is open to atmosphere and permits the fast-flushing of the feed channel with steam. This rapid heating of the filter cake prevents the selected layer of the membrane from being exposed to a sudden heat transient that could crack the ceramic selective layer.

Fast-flushing has a scouring effect on the surface of the membrane. The initial cake released in the feed channel accumulates as a plug that scours and cleans the inside of the membrane lumen while permeate back-flushes the selected layer of the membrane to remove the cake and cool the surface of the membrane. These combined effects permit the continuous operation of the membrane system at flux levels that is 3 to 4 times that of non-steam back-flushed systems.

By combining these two actions, steam above 100° C. can be used to heat treat a membrane system operating at 80° C. The viscosity of bitumen decreases substantially with increasing temperature. The advantage of using direct steam injection is seen by the reduction in viscosity of the bitumen found in processed water filter cakes.

Table 1 below lists the viscosity of Athabasca bitumen as a function of temperature. When increasing the temperature from 20 to 80° C., the viscosity is reduced 1333 times and when increasing the temperature from 80 to 126° C., the viscosity is reduced 23 times.

TABLE 1

Viscosity of Athabascan Bitumen as a Function of Temperature

| Temp C. | Viscosity Pa · s | |
|---|---|---|
| 20° C. | 4000 | |
| 80° C. | 3.0 | 1333 times lower than at 20° C. |
| 126° C. | 0.13 | 23 times lower than 80° C. |

The reduction that facilitates the removal of the filter cake accumulated on the surface of the ceramic membrane. The selective layer of the membrane however, must not be exposed to heat transients as it may crack.

Heating of the selective layer while back-flushing was achieved using a system shown in FIG. 1. The system is meant to be an illustrative and non-limiting example.

Referring to FIG. 1, the system comprises a feed and bleed loop with a membrane module 1, a membrane 2, a circulation pump 3, a feed pump 4, and seven (7) pneumatically actuated valves V1 to V7. Membrane concentrate accumulating in the loop is continuously returned to the feed tank by a separate bleed line (not shown in FIG. 1) connecting the circulation loop to the feed tank.

Under normal operation, valves V2, V3, V5 and V7 are closed; and valves V1, V4 and V6 are open.

For steam fast-flushing, at first, membrane module 1 is isolated from the process loop by closing valves V1, V6 and opening valve V7.

Valves V2 and V5 are then opened and steam is injected directly in the feed channel of membrane module 1 and sent to a feed tank.

In one instance, permeate is back-flushed at 80 psi by closing valve V4 and opening valve V3. In another instance, valves V3 and V4 are closed and the permeate is back-flushed naturally, as the feed channel is depressurized from 50 psig to 0 psig.

The outlet of the feed channel of module 1 is open to atmosphere allowing for the return of the filter cake to the feed tank. The feed tank is blanketed with an inert gas and kept at atmospheric pressure.

After steam fast-flushing, the system is returned to its normal operation by closing valves V2, V3, V5 and V7 and opening V1, V4 and V6.

Figure 2:
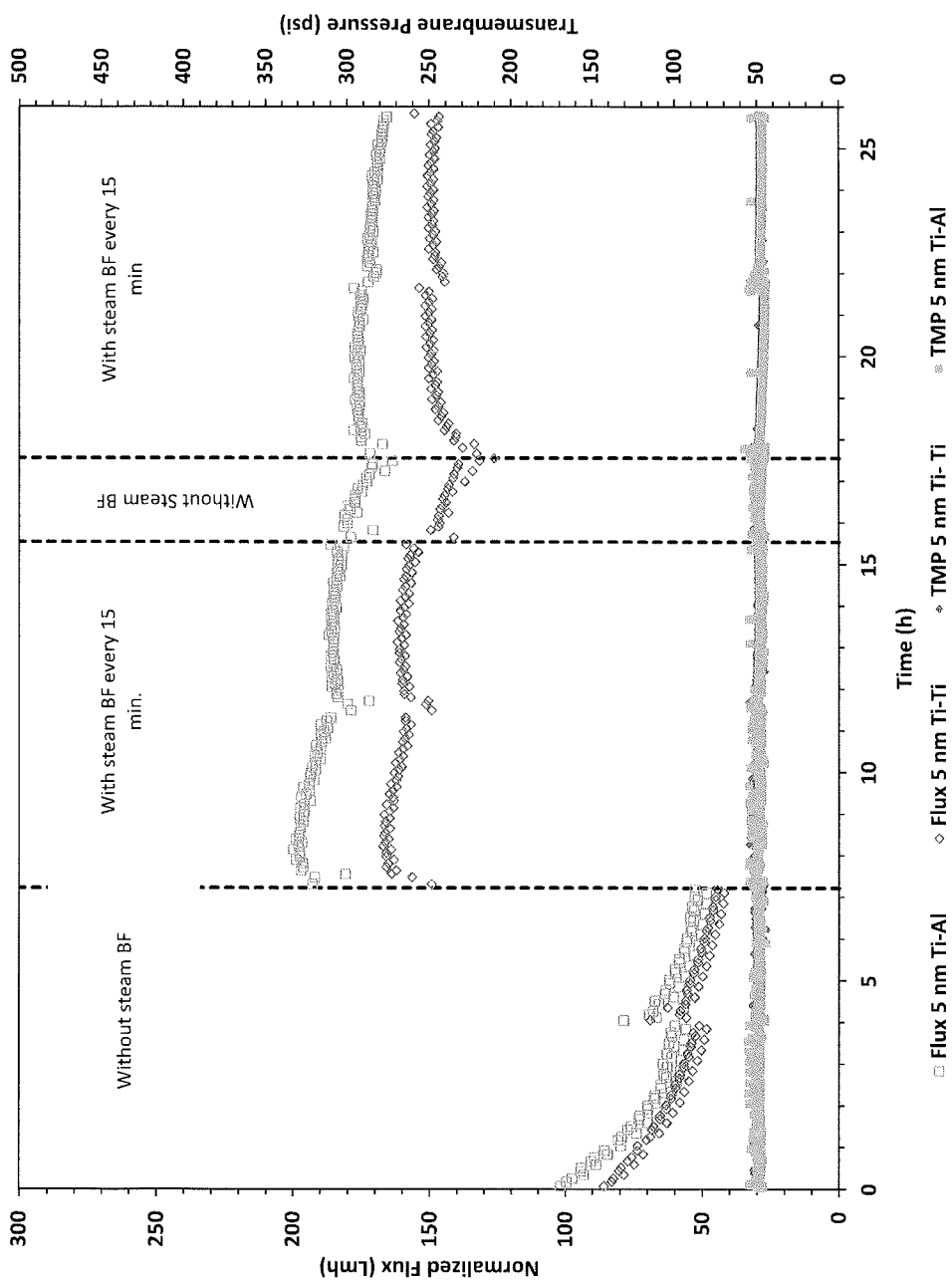
FIG. 2 is a graph showing permeate flux and operating pressure versus time for two membranes treating SAGD process water according to the present invention.

An example of the benefits of this process is provided in FIG. 2 where two membranes, placed in parallel in a circulation loop, treated a feed obtained from a steam assisted gravity drainage (SAGD) operation in Alberta Canada.

The arrangement of the valves is identical for both membrane modules. Only one membrane module with its set of valves is shown in FIG. 1. The membrane is a multi-lumen ceramic tube 2.5 cm in diameter with 19-3.5 mm diameter lumens. Over 2000 liters of SAGD produce water were treated using membranes made from alumina and titania.

The membranes have the following characteristics: pore size 5 nm, selective layer $TiO_2$ and support layer $Al_2O_3$ (Ti—Al) or pore size 5 nm, selective layer $TiO_2$ and the support layer $TiO_2$ (Ti—Ti).

The flux of both membranes in Litres/m$^2$/h (Lmh) and the operating pressures with time are shown in FIG. 2.

FIG. 2 illustrates 7 days of operation at 4 h/day. Steam fast-flushing was performed every 15 minutes of the run while conventional permeate back-flushing was performed on the membranes at five-minute intervals between steam fast-flushing.

The first part of FIG. 2, 0 to 7.2 hours, represents the flux when no steam fast-flushing was performed and conventional permeate back-flushing was performed every 5 minutes.

The second part of FIG. 2, 7.2 to 15.5 hours, represents the flux when steam fast-flushing was performed every 15 minutes and conventional permeate back-flushing performed every 5 minutes.

The third part of FIG. 2, from 15.5 to 17.5 hours, represents the flux when no steam fast-flushing was performed and conventional permeate back-flushing performed every 5 minutes.

The final section of FIG. 2, 17.5 to 26 hours, represents the flux when steam fast-flushing was performed at every 15 minutes and conventional permeate back-flushing performed every 5 minutes.

The effect of steam fast-flushing on permeate flux is shown. It successfully increased the permeate flux by of 150 Lmh for the Ti—Al membrane and 120 Lmh for the Ti—Ti membrane.

On average for both membranes, with conventional permeate back-flushing (without steam fast-flushing), the permeate flux rapidly declined to 48 Lmh, which is well below the acceptable limit for the economical operation a ceramic membrane in treating oily wastewater.

With steam fast-flushing, the permeate flux was maintained at a level above 156 Lmh. This represents a 3.2-time improvement in permeate flux.

In another scenario, membrane module 1 is not isolated from the process loop for the steam fast flushing operation. Here valves V3, V5 and V7 are closed; and valves V1, V4 and V6 are open.

The circulation velocity in the loop is decreased and steam injected directly in the feed channel of the membranes via valve V2. The surge in pressure on steam injection is accounted for by sufficient vapor or inert gas space in the loop (not shown).

The filter cake released from the surface of the membrane is integrated into the contents of the loop and exits via the bleed line of the loop.

Permeate is back-flushed at a pressure greater than the loop pressure by closing valve V4 and opening valve V3.

The steam fast-flushing process is a clean in place method, as the modules are not removed from the system in order to clean them. No cleaning wastewaters or residues are produced as the cake from the steam fast-flushing process is recycled to the feed tank of the membrane loop.

The present invention provides a significant advantage in operating a membrane system particularly in remote areas where cleaning fluids produced when the membranes are chemically cleaned would have to be trucked out and treated off-site. The combination of heating the selective surface of the membrane while back-flushing with permeate offers the continuous and optimal removal of the bituminous cake without the use of chemical cleaning.

While the present invention has been described in considerable detail with reference to certain preferred and/or exemplary embodiments, it will be understood by those skilled in the art that various changes may be made and equivalents may be substituted for elements thereof without departing from the scope of the invention. In addition, many modifications may be made to adapt a particular situation or material to the teachings of the present invention without departing from the essential scope thereof. Therefore, the scope of the appended claims should not be limited by the preferred embodiments set forth in the examples, but should be given the broadest interpretation consistent with the description as a whole.

The invention claimed is:

1. A method for reducing fouling on the surface of a ceramic membrane or filter, the ceramic membrane or filter has a recalcitrant filtration cake on its surface that is non-responsive to removal by regular back-flushing or other physical means of removal in-process, during an operation of a process of filtration,
wherein the ceramic membrane or filter is subjected to steam fast-flushing in-process by injecting steam directly in a feed channel of the ceramic membrane or filter while back-flushing the ceramic membrane or filter at the same time to heat and remove the recalcitrant filtration cake on the ceramic membrane or filter while cooling a selective layer via back-flushing of the ceramic membrane or filter, at the same time or in sequence to the steam fast-flushing to avoid thermal shocking of the ceramic membrane or filter,
wherein the surface of the ceramic membrane or filter is cleaned with the ceramic membrane or filter being stationary during the process of filtration.

2. The method of claim 1, wherein a permeate is resulted from fluid that has initially passed through the ceramic membrane or filter, and wherein the selective layer of the ceramic membrane or filter is back-flushed and cooled by a difference in pressure of the permeate and a depressurized feed stream.

3. The method of claim 1, wherein the steam is injected in the feed channel from a top of a module of the ceramic membrane or filter, and wherein the feed channel at a bottom of the ceramic membrane or filter is connected to a feed tank.

4. The method of claim 1, wherein the steam is injected in the feed channel without isolating a module from a circulation loop.

5. The method of claim 1, wherein the steam cleaning process is performed on a membrane that is not in a feed and bleed loop.

6. The method of claim 2, wherein the selective layer of the ceramic membrane or filter is back-flushed and cooled by the difference in pressure of the permeate and the depressurized feed stream.

7. The method of claim 1, wherein the ceramic membrane or filter is in the form of a flat sheet, multi-pleated sheet, a single tubular lumen or multi-lumen tube.

8. The method of claim 1, wherein a material of the selective layer of the ceramic membrane or filter and a material of a support of the ceramic membrane or filter are ceramic.

9. The method of claim 8, wherein the ceramic is one selected from an oxide of aluminium, titanium, zirconium, or mixtures thereof.

10. The method of claim 1, wherein the material in the selective layer of the ceramic membrane or filter is different from the material of the support of the ceramic membrane or filter.

11. The method of claim 1, wherein the material in the selective layer of the ceramic membrane or filter is identical to the material of the support of the ceramic membrane or filter.

12. The method of claim 1, wherein material of the ceramic membrane or filter is a ceramic and the material of the support of the ceramic membrane or filter is a metal.

13. The method of claim 12, wherein the ceramic is one selected from an oxide of aluminium, titanium, zirconium, or mixtures thereof.

14. The method of claim 1, wherein the filter is metallic, with a pore size of $1 \times 10^{-7}$ m to $1 \times 10^{-3}$ m.

15. The method of claim 1, wherein the ceramic membrane or filter has a pore size of $1 \times 10^{-9}$ m to $1 \times 10^{-5}$ m.

16. The method of claim 1, wherein the ceramic membrane or filter is a sintered inorganic.

17. The method of claim 1, wherein the recalcitrant filtration cake is formed in treating any wastewater.

18. The method of claim 1, wherein the recalcitrant filtration cake is formed in treating oily wastewater.

19. The method of claim 1, wherein the recalcitrant filtration cake is formed in treating bituminous and oily wastewater.

20. The method of claim 1, wherein the recalcitrant filtration cake is formed in treating steam assisted gravity drainage (SAGD) produced water or process water.

* * * * *